United States Patent
Joshi

(10) Patent No.: US 12,033,631 B1
(45) Date of Patent: Jul. 9, 2024

(54) SELF-TRIGGER PREVENTION

(71) Applicant: Amazon Technologies, Inc., Seattle, WA (US)

(72) Inventor: Aditya Sharadchandra Joshi, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 301 days.

(21) Appl. No.: 17/671,724

(22) Filed: Feb. 15, 2022

(51) Int. Cl.
*G10L 15/22* (2006.01)
*G10L 15/08* (2006.01)
*G10L 21/0208* (2013.01)
*G10L 25/06* (2013.01)

(52) U.S. Cl.
CPC ............ *G10L 15/22* (2013.01); *G10L 15/08* (2013.01); *G10L 25/06* (2013.01); *G10L 2015/088* (2013.01); *G10L 2015/223* (2013.01); *G10L 2021/02082* (2013.01)

(58) Field of Classification Search
CPC ............ G10L 15/22; G10L 2015/223; G10L 2015/088; G10L 15/08; G10L 2021/02082
See application file for complete search history.

(56) References Cited

U.S. PATENT DOCUMENTS

| | | | | |
|---|---|---|---|---|
| 9,330,682 B2* | 5/2016 | Suzuki | ................... | G10L 25/78 |
| 9,548,053 B1* | 1/2017 | Basye | ................... | G10L 15/22 |
| 9,947,338 B1* | 4/2018 | Koteshwara | ............. | H04R 5/02 |
| 10,115,411 B1* | 10/2018 | Chu | .................... | G10L 21/0232 |
| 10,186,265 B1* | 1/2019 | Lockhart | ................ | G10L 15/32 |
| 10,586,534 B1* | 3/2020 | Argyropoulos | .......... | G10L 15/22 |
| 11,380,312 B1* | 7/2022 | Mansour | ................. | G10L 15/08 |
| 2015/0006176 A1* | 1/2015 | Pogue | ..................... | G10L 15/22 |
| | | | | 704/249 |
| 2020/0066258 A1* | 2/2020 | Meyers | ................... | G10L 15/20 |

* cited by examiner

*Primary Examiner* — Samuel G Neway
(74) *Attorney, Agent, or Firm* — Pierce Atwood LLP

(57) ABSTRACT

A system configured to perform self-trigger prevention to avoid a device waking itself up when a wakeword is output by the device's own output audio. For example, during active playback the device may perform double-talk detection and suppress wakewords or other device-directed utterances when near-end speech is not present. To detect whether near-end speech is present, an Audio Front End (AFE) of the device may perform echo cancellation and generate correlation data indicating an amount of correlation between an output of the echo canceller and an estimated reference signal. When the correlation is high in certain frequency ranges, near-end speech is not present and the device may suppress the utterance. When the correlation is low, indicating that near-end speech could be present, the device does not suppress the utterance and sends the utterance to a remote system for speech processing.

20 Claims, 14 Drawing Sheets

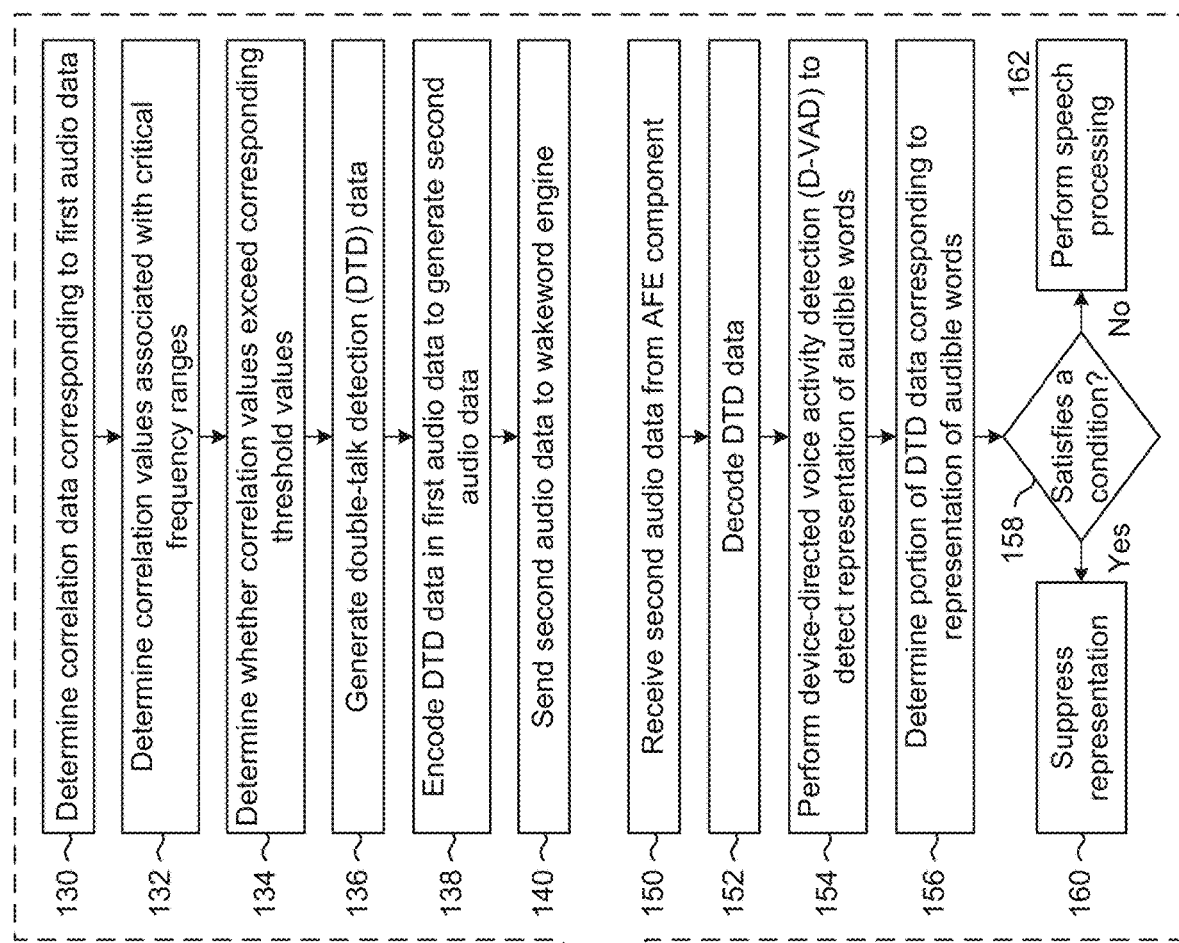
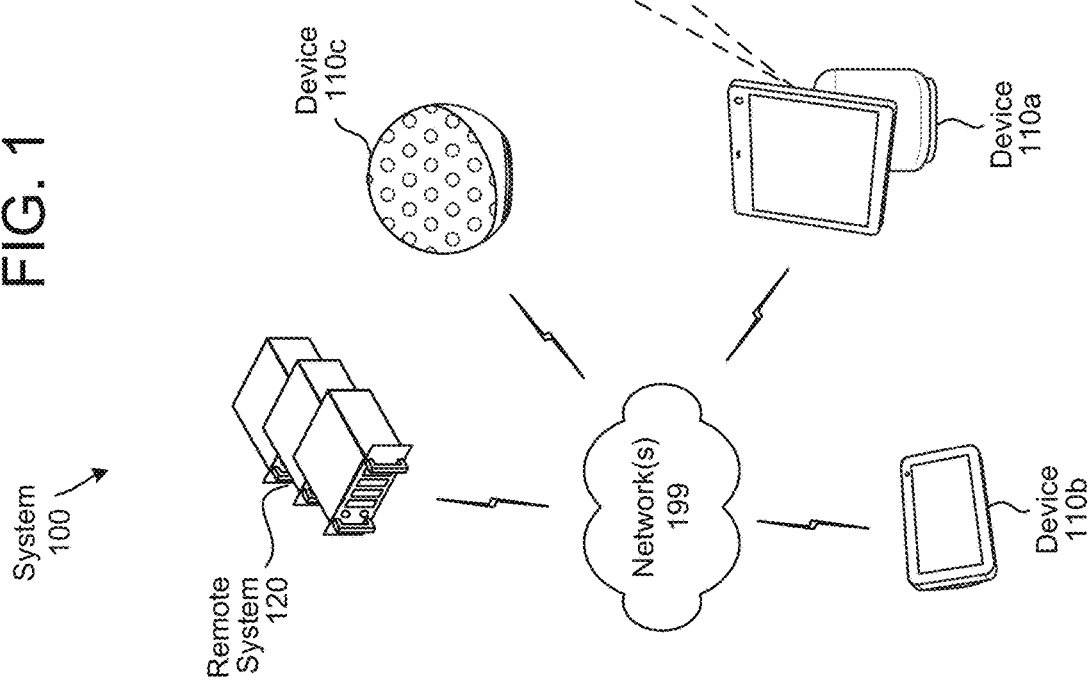
FIG. 1

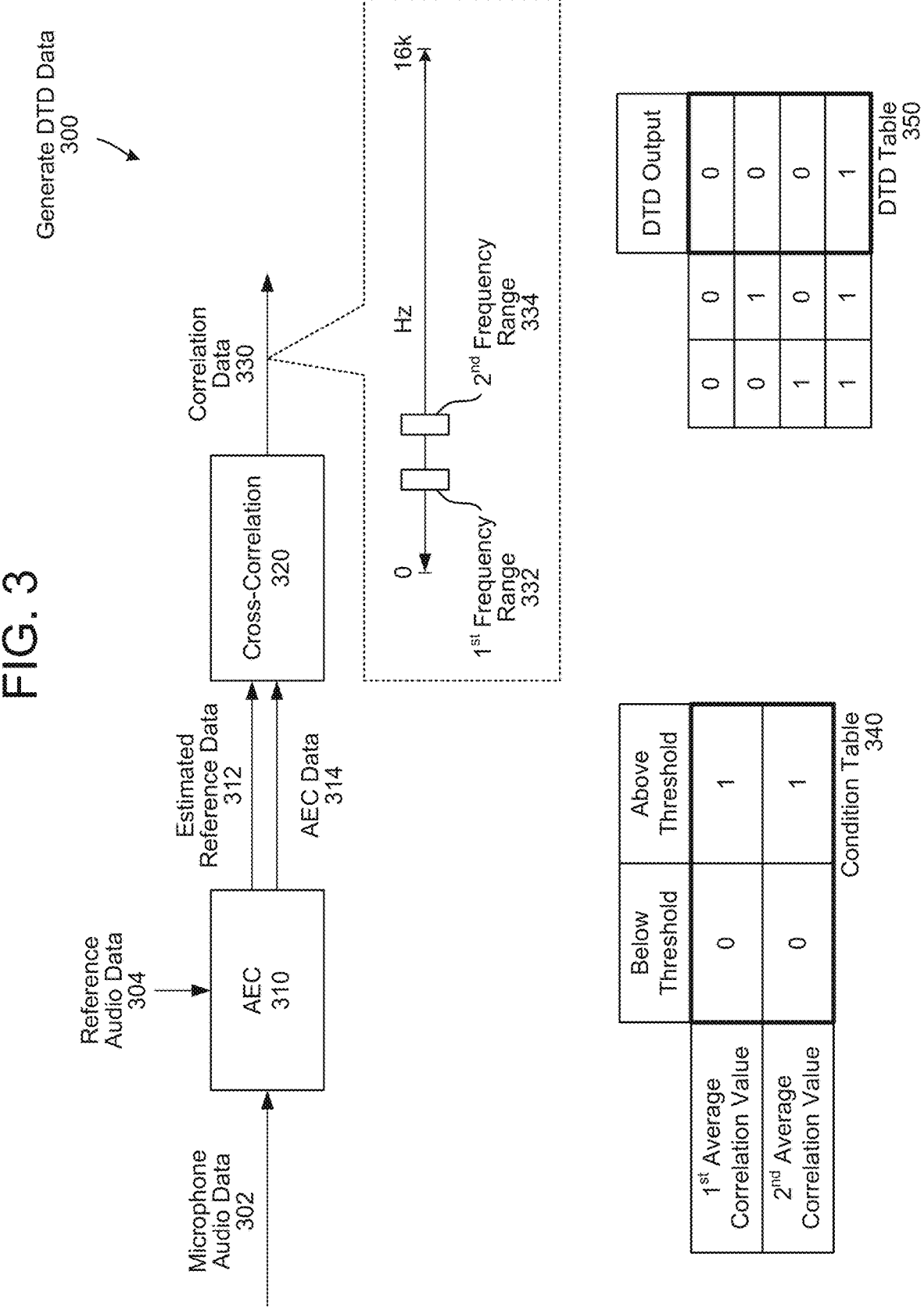

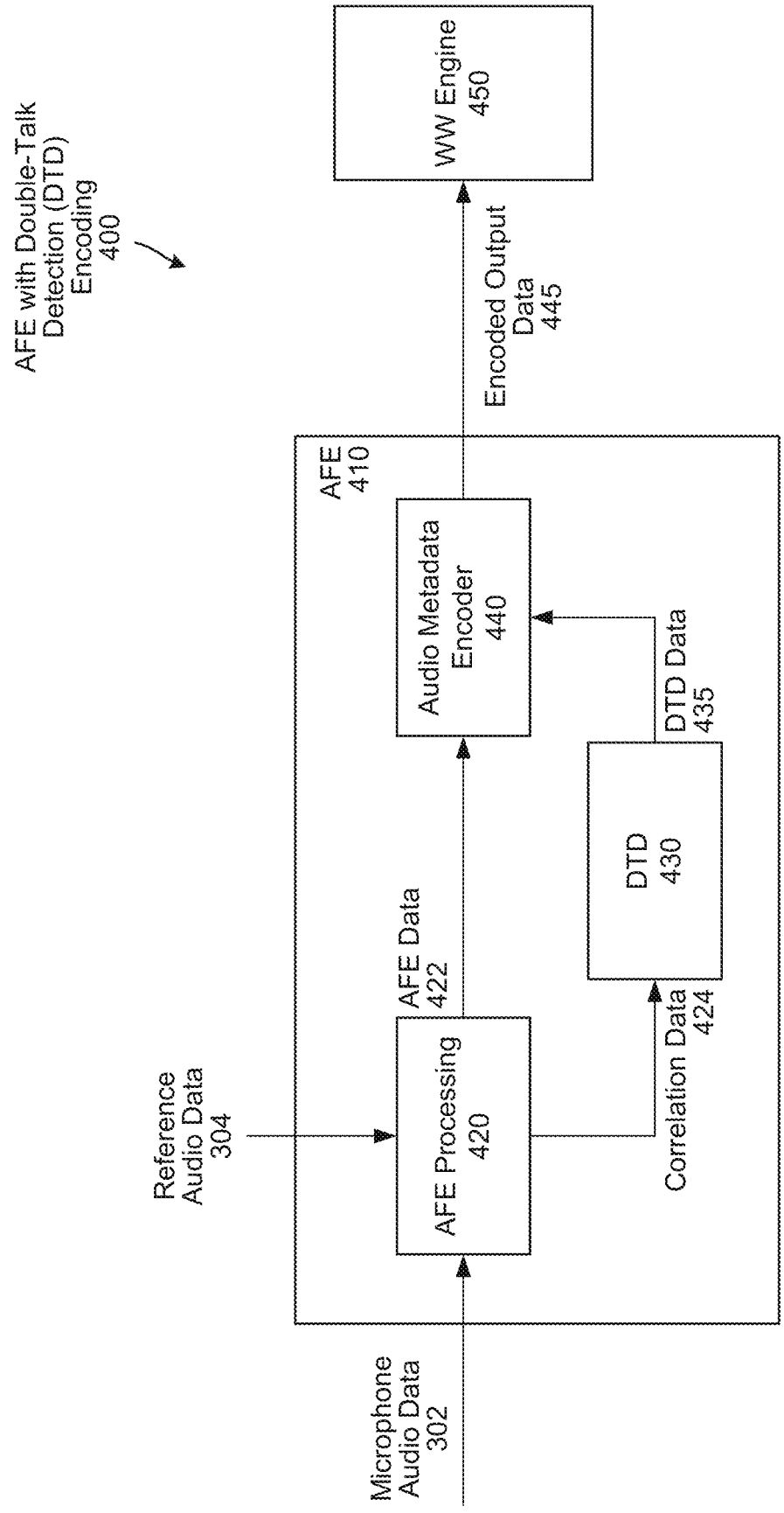

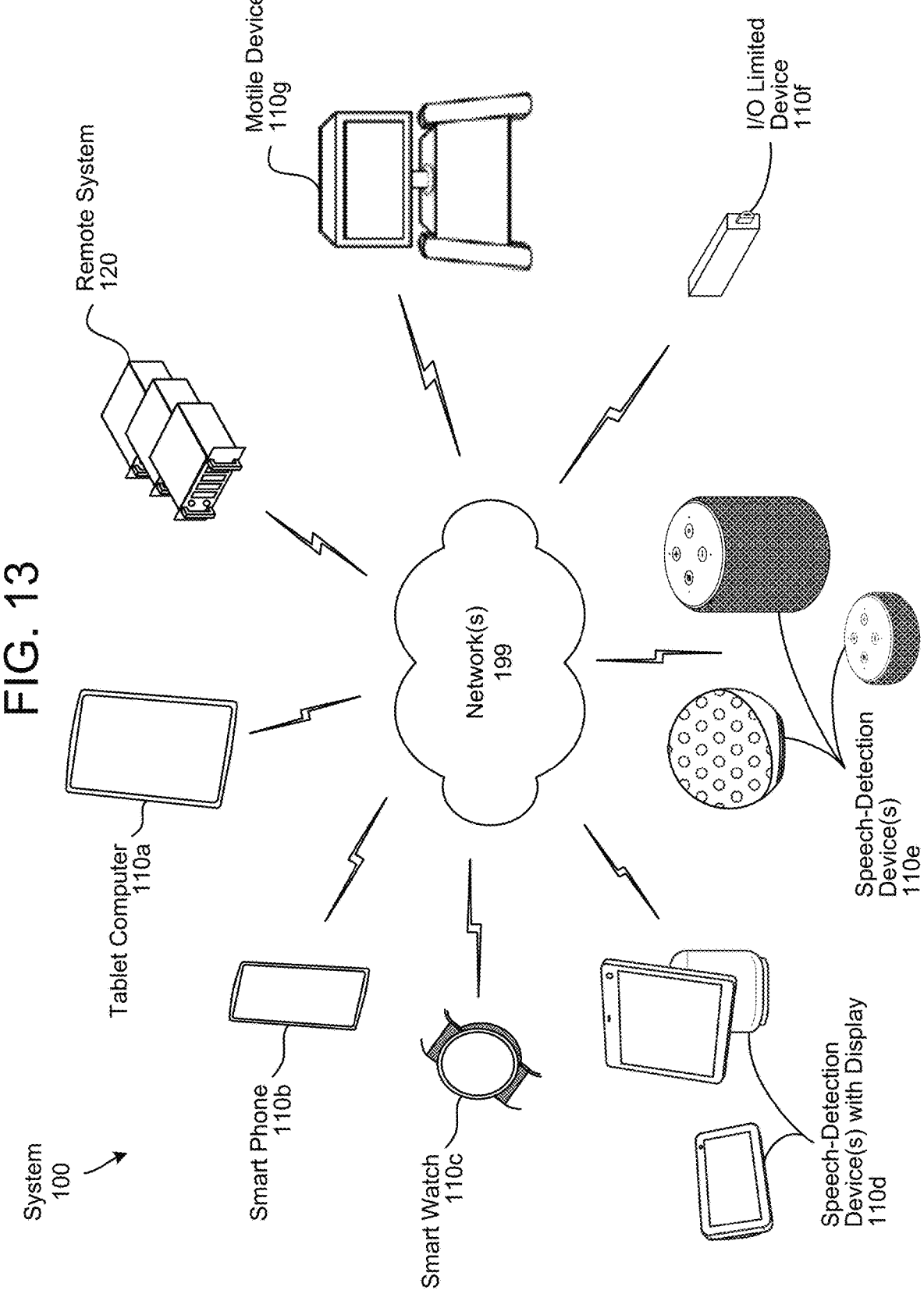

SELF-TRIGGER PREVENTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 is a conceptual diagram illustrating a system configured to prevent self-triggering according to embodiments of the present disclosure.

FIG. 3 illustrates an example of generating double-talk detection (DTD) data according to embodiments of the present disclosure.

FIG. 4 illustrates an example component diagram for an audio front end (AFE) component configured to encode DTD data according to embodiments of the present disclosure.

FIG. 13 illustrates an example of a computer network for use with the overall system, according to embodiments of the present disclosure.

DETAILED DESCRIPTION

Figure 2A:
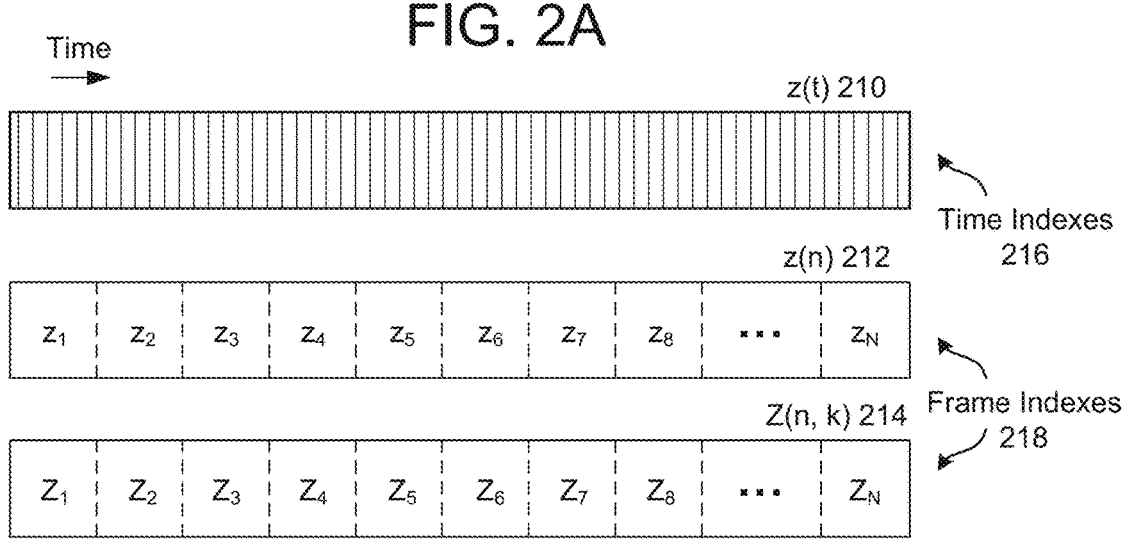
FIGS. 2A-2D illustrate examples of frame indexes, tone indexes, and channel indexes.

Electronic devices may be used to capture input audio and process input audio data. The input audio data may be used for voice commands and/or sent to a remote device as part of a communication session. To detect a voice command, a device may perform wakeword detection to determine that a wakeword (e.g., keyword) is present in speech represented in the input audio data. When the device detects the wakeword, the device may send a portion of the input audio data corresponding to the voice command to a remote system for speech processing.

If the device generates output audio that includes a wakeword, there is a chance that the input audio data may include a representation of the wakeword (e.g., echo signal). The device may perform echo cancellation to remove the echo signal, but in some circumstances an output of the echo cancellation may include residual echo corresponding to the representation of the wakeword. If an amount of residual echo exceeds an energy limit, the residual echo may trigger a wakeword engine of the device to self-trigger and detect the wakeword that was originally output by the device.

To improve wakeword detection, devices, systems and methods are disclosed that perform self-trigger prevention to avoid a device waking itself up when a wakeword or representation of audible words is output by the device's own output audio. For example, during active playback the device may perform double-talk detection and suppress wakewords or representations of audible words when near-end speech is not present. To detect whether near-end speech is present, an Audio Front End (AFE) of the device may perform echo cancellation and generate correlation data indicating an amount of correlation between an output of the echo canceller and an estimated reference signal. When the correlation is high in certain frequency ranges, near-end speech is not present and the device may suppress a representation of audible words (e.g., machine generated audio). When the correlation is low, indicating that near-end speech could be present, the device does not suppress a representation of audible words (e.g., user utterance) and sends audio data to a remote system for speech processing.

FIG. 1 is a conceptual diagram illustrating a system configured to prevent self-triggering according to embodiments of the present disclosure. As illustrated in FIG. 1, a system 100 may include multiple devices 110a/110b/110c connected across one or more networks 199. In some examples, the devices 110 (local to a user) may also be connected to a remote system 120 across the one or more networks 199, although the disclosure is not limited thereto.

The device 110 may be an electronic device configured to capture and/or receive audio data. For example, the device 110 may include a microphone array configured to generate input audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive output audio data and generate output audio using one or more loudspeakers of the device 110. For example, the device 110 may generate output audio corresponding to media content, such as music, a movie, and/or the like.

As illustrated in FIG. 1, the system 100 may include three separate devices 110a-110c, which may be in proximity to each other in an environment, although the disclosure is not limited thereto and any number of devices may be present in the environment without departing from the disclosure. The devices 110a-110c may be speech-enabled, meaning that they are configured to perform voice commands generated by a user. To detect a voice command, in some examples the first device 110a may generate input audio data and may perform wakeword detection to determine that a wakeword (e.g., keyword) is present in speech represented in the input audio data. However, the disclosure is not limited thereto and in other examples the first device 110a may generate input audio data and perform device-directed voice activity detection (D-VAD) processing to determine that a representation of audible words is directed at the first device 110a.

When the first device 110a detects the wakeword, the first device 110a may send a portion of the input audio data corresponding to the voice command to the remote system 120 for speech processing. However, if the first device 110a generates output audio that includes a wakeword, there is a chance that the input audio data may include a representation of the wakeword (e.g., echo signal). The first device 110a may perform echo cancellation to remove the echo signal, but in some circumstances an output of the echo cancellation may include residual echo corresponding to the representation of the wakeword. If an amount of residual echo exceeds an energy limit, the residual echo may trigger a wakeword engine of the first device 110a to self-trigger and detect the wakeword that was originally output by the first device 110a. While the example described above refers to the first device 110a detecting the wakeword that was originally output by the first device 110a, this is intended to conceptually illustrate an example and the disclosure is not limited thereto. In some examples, the first device 110a may generate output audio that includes a representation of audible words, and if the residual echo includes the representation of audible words and exceeds the energy limit, the residual echo may trigger the wakeword engine of the first device 110a to self-trigger and detect the representation of audible words that was originally output by the first device 110a.

The first device 110a may be configured to distinguish between different system conditions. As used herein, "single-talk conditions" correspond to when a single person is talking at a given time, which can occur when the communication session includes only local speech (e.g., a local user is speaking near the first device 110a) or only remote speech (e.g., a remote user is speaking near a remote device). For example, near-end single-talk conditions occur when local speech is represented in first audio data captured by the first device 110a and remote speech is not represented in second audio data that is captured by the remote device and sent to the first device 110a. In contrast, far-end single-talk conditions occur when remote speech is represented in the second audio data captured by the remote device and local speech is not represented in the first audio data captured by the first device 110a. As used herein, "double-talk conditions" correspond to when both the local user and the remote user are talking at a given time, which occurs when the communication session includes both local speech and remote speech. For example, double-talk conditions occur when local speech is represented in the first audio data captured by the first device 110a and remote speech is also represented in the second audio data that is captured by the remote device and sent to the first device 110a. In some examples, no-speech conditions may be present (e.g., there is no local speech or remote speech), which the first device 110a may treat as single-talk conditions without departing from the disclosure.

To prevent self-triggering, the first device 110a may be configured to perform self-trigger prevention and suppress the wakeword engine when local speech is not detected. For example, the first device 110a may perform double-talk detection (DTD) processing to distinguish between near-end single-talk conditions (e.g., local speech), far-end single-talk conditions (e.g., remote speech), and double-talk conditions (e.g., local speech and remote speech). If the first device 110a detects near-end single-talk conditions or double-talk conditions, the first device 110a may enable the wakeword engine to detect a wakeword or representation of audible words and send a portion of the input audio data corresponding to the voice command to the remote system 120 for speech processing. However, if the first device 110a detects far-end single-talk conditions, which means that the input audio data corresponds to machine generated audio, the first device 110a may suppress the wakeword engine and ignore the wakeword or representation of audible words included in the input audio data.

As used herein, machine generated audio indicates that a source of the wakeword or the representation of audible words is a non-human entity, such as the first device 110a or another device 110 in proximity to the first device 110a. For example, input audio data may correspond to machine generated audio when there is a strong correlation between the reference audio data being output to the loudspeakers and the first audio data captured by the first device 110a. This may occur because the first device 110a recaptures at least a portion of the remote speech output by the loudspeakers of the first device 110a as an echo signal while local speech is not present (e.g., local speech or other audible sounds generated near the first device 110a are not represented in the first audio data).

As illustrated in FIG. 1, the device 110 may determine (130) correlation data corresponding to first audio data and determine (132) correlation values associated with critical frequency ranges. For example, the device 110 may perform echo cancellation to generate the first audio data and may determine the correlation data by calculating a cross-correlation between the first audio data and estimated reference data used in the echo cancellation. The device 110 may then select a first plurality of correlation values associated with a first frequency range and determine a first correlation value using the first plurality of correlation values. The device 110 may also select a second plurality of correlation values associated with a second frequency range and determine a second correlation value using the second plurality of correlation values. While the example described above refers to two correlation values corresponding to two frequency ranges, the disclosure is not limited thereto and the number of correlation values and/or frequency ranges may vary without departing from the disclosure.

The device 110 may determine (134) whether the correlation values exceed corresponding threshold values and may generate (136) double-talk detection (DTD) data, as described in greater detail below with regard to FIG. 3. For example, the device 110 may compare the first correlation value to a first threshold value and determine whether the first correlation value satisfies a condition (e.g., if the first correlation value exceeds the first threshold value, the first correlation satisfies the condition). Similarly, the device 110 may compare the second correlation value to a second threshold value and determine whether the second correlation value satisfies a condition (e.g., if the second correlation value exceeds the second threshold value, the second correlation satisfies the condition). If either correlation value does not satisfy the condition, the DTD data indicates a first value (e.g., "0"), whereas if both correlation values satisfy the condition, the DTD data indicates a second value (e.g., "1").

An Audio Front End (AFE) component of the device 110 may encode (138) the DTD data in the first audio data to generate second audio data and may send (140) the second audio data from an to a wakeword engine of the device 110. The wakeword engine of the device 110 may receive (150) the second audio data from the AFE component and may decode (152) the DTD data. For example, the wakeword engine may determine a DTD value for an individual audio frame of the second audio data and may associate it with a sample index associated with the wakeword engine.

The device 110 may perform (154) device-directed voice activity detection (D-VAD) processing to detect a representation of audible words that are directed at the device 110. For example, the wakeword engine may intelligently track when a representation of audible words is directed to the device 110 (e.g., device-directed). By performing D-VAD processing, the wakeword engine enables the device 110 to process voice commands without requiring the user to invoke the wakeword. For example, the wakeword engine may detect a device-directed representation of audible words and determine a boundary corresponding to the representation of audible words (e.g., sequence of audible words represented in the second audio data). Thus, the wakeword engine may determine a start time indicating when the representation of audible words was first detected in the second audio data and an end time indicating when the representation of audible words is no longer detected in the second audio data, although the disclosure is not limited thereto.

The device 110 may determine (156) a portion of DTD data corresponding to the representation of audible words and determine whether the portion of DTD data satisfies a condition. For example, the device 110 may select a portion of DTD data that corresponds to the boundary, such as DTD values decoded from the second audio data between the start time and the end time. If the portion of the DTD data includes the first value (e.g., any of the DTD values have a value of "0"), the DTD data does not satisfy the condition. However, if the portion of the DTD data corresponds to the second value (e.g., all of the DTD values have a value of "1"), the DTD data satisfies the condition.

If the DTD data satisfies the condition, the device 110 may suppress (160) the representation and ignore the device-directed representation of audible words detected by the wakeword engine. In contrast, if the DTD data does not satisfy the condition, the device 110 may perform (162) speech processing or cause speech processing to be performed on the device-directed representation of audible words. For example, the device 110 may send a portion of the second audio data to the remote system 120 for speech processing, although the disclosure is not limited thereto.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data z(t) using microphone(s) 1120. For example, a first microphone may generate first microphone audio data $z_1(t)$ in the time-domain, a second microphone may generate second microphone audio data $z_2(t)$ in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
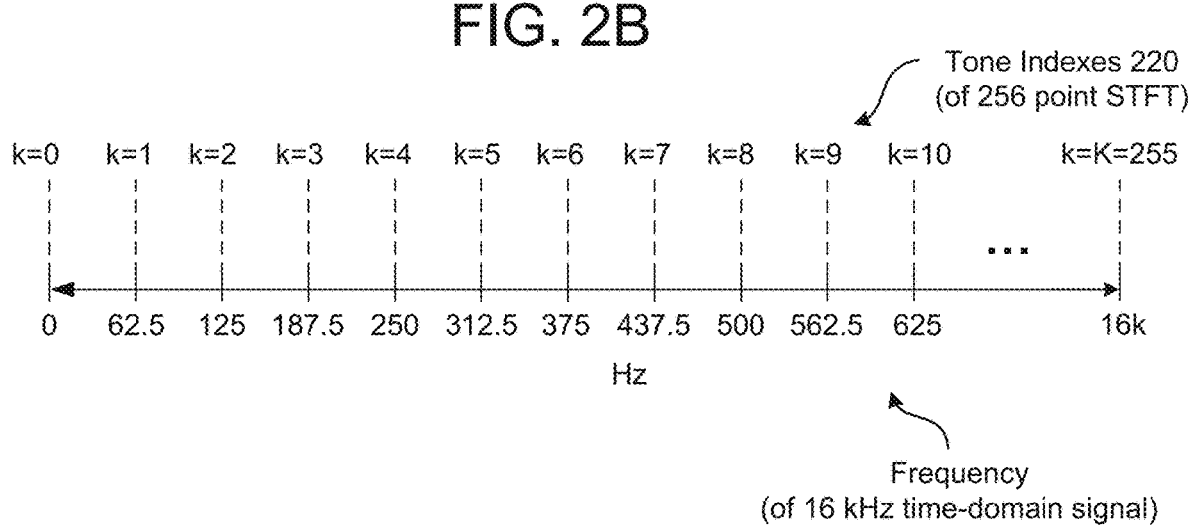

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
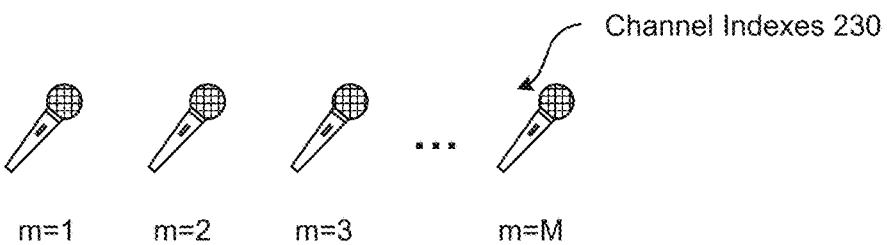

The system 100 may include multiple microphones 1120, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones 1120, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data $z_1(n)$ associated with a first microphone to no longer be synchronized with second microphone audio data $z_2(n)$ associated with a second microphone. Thus, the device 110 may instead modify only the playback audio data x(n) so that the playback audio data x(n) is synchronized with the first microphone audio data $z_1(n)$.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n-1 previous audio frames) corresponding to the fixed time window. Thus, subsequent power calculations include n overlapping audio frames.

Figure 2D:
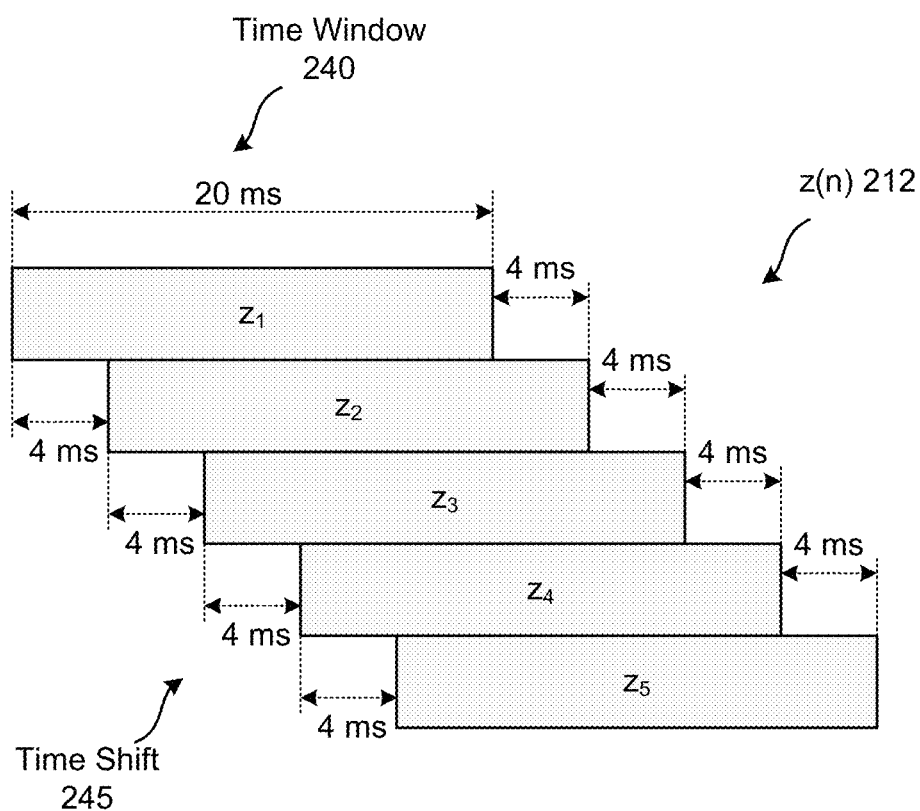

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

FIG. 3 illustrates an example of generating double-talk detection (DTD) data according to embodiments of the present disclosure. As described above with regard to FIG. 1, the device 110 may generate DTD data by determining correlation data, using the correlation data to determine correlation values for two or more frequency ranges (e.g., an individual correlation value associated with each frequency range), comparing the correlation values to respective threshold values to determine whether the correlation values satisfy a condition, and generating the DTD data indicating whether all of the correlation values satisfy the condition. When at least one of the correlation values does not satisfy the condition (e.g., a correlation value is below a corresponding threshold value), the DTD data represents a first value (e.g., "0"), which indicates that local speech may be present. In contrast, when all of the correlation values satisfy the condition, the DTD data represents a second value (e.g., "1"), which indicates that local speech is not present and that the utterance corresponds to machine generated audio.

As illustrated in FIG. 3, the device 110 may generate DTD data 300 as part of performing acoustic echo cancellation (AEC). For example, an AEC component may receive microphone audio data 302 and reference audio data 304 and may perform echo cancellation to remove a representation of the reference audio data 304 from the microphone audio data 302. As illustrated in FIG. 3, the AEC component 310 may determine estimated reference data 312 corresponding to the reference audio data 304 and may remove the estimated reference data 312 from the microphone audio data 302 to generate AEC data 314.

Thus, if the AEC component 310 accurately generates the estimated reference data 312, such that the estimated reference data 312 corresponds to the representation of the reference audio data 304 included in the microphone audio data 302, the AEC data 314 includes a representation of local speech without residual echo. However, if the AEC component 310 generates estimated reference data 312 that does not correspond to the representation of the reference audio data 304 included in the microphone audio data 302, the AEC data 314 includes a representation of local speech along with a varying amount of residual echo. The residual echo may depend on several factors, such as distance(s) between loudspeaker(s) and microphone(s), a Signal to Echo Ratio (SER) value of the input to the AFE component, loudspeaker distortions, echo path changes, convergence/tracking speed, and/or the like, although the disclosure is not limited thereto.

As illustrated in FIG. 3, the AEC component 310 may output the estimated reference data 312 and the AEC data 314 to a cross-correlation component 320 that is configured to generate correlation data 330. For example, the cross-correlation component 320 may generate the correlation data 330 by determining a cross-correlation between the estimated reference data 312 and the AEC data 314. While FIG. 3 illustrates the cross-correlation component 320 as being separate from the AEC component 310, the disclosure is not limited thereto and the AEC component 310 may be configured to generate the correlation data 330 without departing from the disclosure.

After generating the correlation data 330, the device 110 may use the correlation data 330 to determine individual correlation values corresponding to two or more frequency ranges. For example, FIG. 3 illustrates an example in which the device 110 generates a first correlation value (e.g., first average correlation value) corresponding to a first frequency range 332 and a second correlation value (e.g., second average correlation value) corresponding to a second frequency range 334. While FIG. 3 illustrates an example in which the device 110 generates the first correlation value and the second correlation value, corresponding to two frequency ranges, the disclosure is not limited thereto. Instead, the device 110 may generate three or more correlation values, corresponding to three or more frequency ranges, without departing from the disclosure.

In some examples, the first frequency range 332 may include multiple subbands (e.g., tone indexes), such as subbands 15-17, which correspond to a frequency range between 937.5 Hz and 1062.5 Hz, although the disclosure is not limited thereto. Similarly, the second frequency range 334 may also include multiple subbands, such as subbands 32-64, which correspond to a frequency range between 2000

Hz and 4000 Hz, although the disclosure is not limited thereto. However, the disclosure is not limited thereto and the number of subbands, the individual subbands, and/or the individual frequencies may vary without departing from the disclosure.

In the example illustrated in FIG. 3, the device 110 may determine the first correlation value by determining a first plurality of correlation values included in the first frequency range 332 and determining an arithmetic mean (e.g., average) of the first plurality of correlation values. Similarly, the device 110 may determine the second correlation value by determining a second plurality of correlation values included in the second frequency range 334 and determining the arithmetic mean of the second plurality of correlation values. However, the disclosure is not limited thereto, and the device 110 may determine the first correlation value and/or the second correlation value using other techniques without departing from the disclosure.

After determining the correlation values, the device 110 may determine whether each of the correlation values satisfies a condition. For example, the device 110 may determine whether the first correlation satisfies a condition by comparing the first correlation value to a first threshold value (e.g., 0.05, although the disclosure is not limited thereto). Similarly, the device 110 may determine whether the second correlation value satisfies a condition by comparing the second correlation value to a second threshold value (e.g., 0.5, although the disclosure is not limited thereto). FIG. 3 illustrates an example of a condition table 340 in which not satisfying the condition is represented by a first value (e.g., "0"), while satisfying the condition is represented by a second value (e.g., "1").

The device 110 may determine the DTD data based on whether both of the correlation values satisfy the condition. Using the condition values generated by the condition table 340 as inputs to the DTD table 350, the device 110 may generate the DTD data for an individual audio frame. For example, if either the first correlation value or the second correlation value do not satisfy the condition and correspond to the first value (e.g., "0"), the DTD data also corresponds to the first value (e.g., "0"), which indicates that local speech may be present. However, if the first correlation value and the second correlation value satisfy the condition and correspond to the second value (e.g., "1"), the DTD data also corresponds to the second value (e.g., "1"), which indicates that local speech is not present and that the utterance corresponds to machine generated audio. Thus, the device 110 determines that the DTD data corresponds to the second value only when all of the conditions are satisfied.

FIG. 4 illustrates an example component diagram for an Audio Front End (AFE) component configured to encode double-talk detection (DTD) data according to embodiments of the present disclosure. In the example of an AFE with DTD encoding 400 illustrated in FIG. 4, an AFE component 410 may include an AFE processing component 420, a DTD component 430, and an audio metadata encoder component 440, although the disclosure is not limited thereto.

As illustrated in FIG. 4, the AFE processing component 420 may receive the microphone audio data 302 and the reference audio data 304 and may perform AFE processing to generate AFE data 422. For example, AFE processing may include acoustic echo cancellation (AEC) processing, beamforming, adaptive interference cancellation (AIC) processing, residual echo suppression (RES) processing, noise reduction (NR) processing, and/or the like, although the disclosure is not limited thereto.

In addition to the AFE data 422, the AFE processing component 420 may use the techniques described in greater detail above to generate correlation data 424. For example, the AFE processing component 420 may generate the correlation data 424 by determining a cross-correlation between estimated reference data and AEC data generated by an AEC component included in the AFE component 410. Similarly, the DTD component 430 may use the techniques described in greater detail above with regard to FIG. 3 to process the correlation data 424 and generate DTD data 435.

In some examples, the AFE component 410 may include additional components to enable synchronization with a wakeword engine 450. For example, the AFE component 410 may enable audio frame synchronization by maintaining AFE sample indexes between the AFE component 410 and the wakeword engine 450 without departing from the disclosure. In some examples, the AFE component 410 may perform audio encoding to send timestamp information (e.g., AFE sample indexes) to the wakeword engine 450 on a per frame basis, enabling the wakeword engine 450 to perform wakeword detection with reference to the AFE sample indexes, although the disclosure is not limited thereto.

While not illustrated in FIG. 4, the AFE component 410 may include a timestamp generator, which is configured to generate timestamp data indicating an AFE sample index for each audio frame, in addition to the audio metadata encoder component 440, which is configured to encode the AFE data 422 with the timestamp data and/or the DTD data 435 to generate encoded output data 445. For example, the timestamp generator (not illustrated) may generate a first timestamp that indicates a first AFE sample index corresponding to a first audio frame of the AFE data 422, a second timestamp that indicates a second AFE sample index corresponding to a second audio frame of the AFE data 422, and so on for a plurality of audio frames.

In some examples, the audio metadata encoder 440 may generate the encoded output data 445 by encoding the first timestamp in the first audio frame of the AFE data 422, encoding the second timestamp in the second audio frame of the AFE data 422, and so on for each of the plurality of audio frames. For example, the audio metadata encoder 440 may encode the timestamp values in the Least Significant Bits (LSBs) of the AFE data 422 in order to generate the encoded output data 445, although the disclosure is not limited thereto. Thus, the first timestamp indicates the first AFE sample index that corresponds to both the first audio frame of the AFE data 422 and the first audio frame of the encoded output data 445, the second timestamp indicates the second AFE sample index that corresponds to both the second audio frame of the AFE data 422 and the second audio frame of the encoded output data 445, and so on.

Additionally or alternatively, the audio metadata encoder component 440 may encode the DTD data 435 in corresponding audio frames. For example, the audio metadata encoder component 440 may encode a first DTD value in the first audio frame of the AFE data 422, may encode a second DTD value in the second audio frame of the AFE data 422, and so on for the plurality of audio frames. The audio metadata encoder 440 may encode the DTD data 435 in the LSBs of the AFE data 422 in order to generate the encoded output data 445, although the disclosure is not limited thereto.

In some examples, the audio metadata encoder component 440 may encode the DTD data 435 without encoding the timestamp data. Thus, the first audio frame of the encoded output data 445 may include the first timestamp and/or the first DTD value, the second audio frame of the encoded output data 445 may include the second timestamp and/or the second DTD value, and so on without departing from the disclosure. As illustrated in FIG. 4, the AFE component 410 may send the encoded output data 445 to the wakeword engine 450 and the wakeword engine 450 may use the encoded output data 445 to perform wakeword detection and/or the like.

In some examples, the wakeword engine 450 may be configured to perform wakeword detection and determine whether a wakeword (e.g., keyword) is represented in the encoded output data 445. If the wakeword is detected, the wakeword engine 450 may determine a wakeword boundary corresponding to the wakeword, such as a start time indicating when the wakeword was first detected in the encoded output data 445 and an end time indicating when the wakeword is no longer detected in the encoded output data 445. Thus, the wakeword engine 450 may indicate that the wakeword is detected, the start time, the end time, and/or the like, although the disclosure is not limited thereto. In other examples, however, the wakeword engine 450 may detect the wakeword, determine that the wakeword is a beginning of a representation of audible words, and determine a boundary corresponding to the representation of audible words (e.g., sequence of audible words represented in the encoded output data 445). Thus, the wakeword engine 450 may determine a start time indicating when the representation of audible words was first detected in the encoded output data 445 and an end time indicating when the representation of audible words is no longer detected in the encoded output data 445.

The wakeword engine 450 is not limited to performing wakeword detection, however. In some examples, the wakeword engine 450 may perform device-directed voice activity detection (D-VAD) to intelligently track when a representation of audible words is directed to the device 110 (e.g., device-directed). By performing D-VAD processing, the wakeword engine 450 enables the device 110 to process voice commands without requiring the user to invoke the wakeword. For example, the wakeword engine 450 may detect a device-directed representation of audible words and determine a boundary corresponding to the representation of audible words (e.g., sequence of audible words represented in the encoded output data 445). Thus, the wakeword engine 450 may determine a start time indicating when the representation of audible words was first detected in the encoded output data 445 and an end time indicating when the representation of audible words is no longer detected in the encoded output data 445, although the disclosure is not limited thereto.

Figure 5:
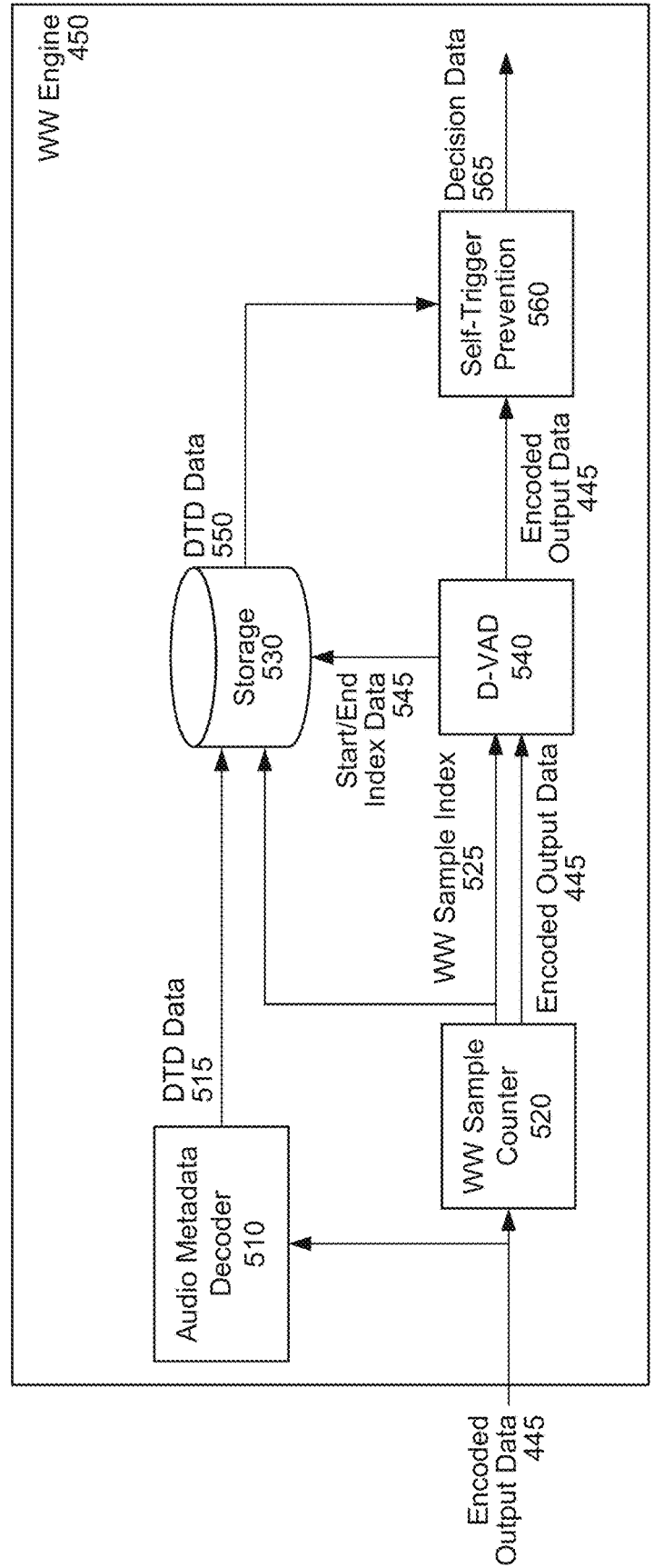
FIG. 5 illustrates an example component diagram for performing self-trigger prevention according to embodiments of the present disclosure.

FIG. 5 illustrates an example component diagram for performing self-trigger prevention according to embodiments of the present disclosure. As described above, the AFE component 410 may encode the AFE data 422 with the timestamp data (e.g., AFE sample indexes) and/or the DTD data 435 to generate the encoded output data 445 that is sent to the wakeword engine 450. As illustrated in FIG. 5, the wakeword engine 450 may perform self-trigger prevention 500 by decoding the timestamp data and/or the DTD data 515 from the encoded output data 445 and maintaining an association between the DTD data 515, the timestamp data, and/or WW sample indexes. For example, the wakeword engine 450 may include an audio metadata decoder 510 that is configured to receive the encoded output data 445 and extract DTD data 515 and/or a timestamp for a current audio frame of the encoded output data 445. In addition, the wakeword engine 450 may include a wakeword sample counter 520 that is configured to generate a WW sample index 525 corresponding to the current audio frame of the encoded output data 445.

As the encoded output data 445 may optionally include the timestamp data and/or the audio metadata decoder 510 may be configured to decode the timestamp data from the encoded output data 445, the wakeword engine 450 may be configured to convert a boundary from the WW sample indexes to the AFE sample indexes (e.g., timestamp data) without departing from the disclosure. For example, a storage component 530 (e.g., buffer) may store an association between a timestamp and a WW sample index without departing from the disclosure. However, the disclosure is not limited thereto and the audio metadata decoder 510 may not decode the timestamp data without departing from the disclosure. For ease of illustration, the following description will refer to the WW sample indexes and omit any reference to the timestamp data.

The audio metadata decoder 510 may output the DTD data 515 to the storage component 530. In addition, the wakeword sample counter 520 may output the WW sample index 525 to the storage component 530. Thus, the storage component 530 may store an association between the DTD data 515 and the WW sample index 525 for the current audio frame of the encoded output data 445.

A device-directed voice activity detection (D-VAD) component 540 may perform D-VAD processing to determine whether a representation of audible words (e.g., sequence of audible words) that is directed at the device 110 is represented in the encoded output data 445. When the D-VAD component 540 determines that a representation of audible words is represented in the encoded output data 445, the D-VAD component 540 may determine a portion of the encoded output data 445 in which the representation of audible words is represented and may generate start/end index data 545 corresponding to the portion of the encoded output data 445. For example, the start/end index data 545 may include a start WW sample index corresponding to a beginning of the representation of audible words (e.g., first audio frame of the portion of the encoded output data 445) and an end WW sample index corresponding to an ending of the representation of audible words (e.g., final audio frame of the portion of the encoded output data 445).

The D-VAD component 540 may output the start/end index data 545 to the storage component 530 and the storage component 530 may use the previously stored associations to identify DTD data 550 corresponding to the start/end index data 545. For example, the storage component 530 may identify a plurality of DTD values associated with audio frames between the start WW sample index and the end WW sample index and the DTD data 550 may include the plurality of DTD values.

A self-trigger prevention component 560 may receive the encoded output data 445 and the DTD data 550 and may generate decision data 565. For example, the self-trigger prevention component 560 may determine whether the plurality of DTD values associated with the representation of audible words includes the first value (e.g., "0"). If any of the plurality of DTD values corresponds to the first value, the self-trigger prevention component 560 may set the decision data 565 to the first value (e.g., "0"), which indicates that local speech may be present. Thus, the self-trigger prevention component 560 qualifies the representation of audible words as a user utterance and may send a portion of the encoded output data 445 representing the user utterance to the remote system 120 for speech processing. In contrast, if all of the plurality of DTD values corresponds to the second value (e.g., "1"), the self-trigger prevention component 560 may set the decision data 565 to the second value (e.g., "1"), which indicates that local speech is not present and that the utterance corresponds to machine generated audio. Thus, the self-trigger prevention component 560 qualifies the representation of audible words as a self-trigger caused by machine generated audio and determines to suppress the D-VAD and ignore a portion of the encoded output data 445 corresponding to the representation.

Figure 6:
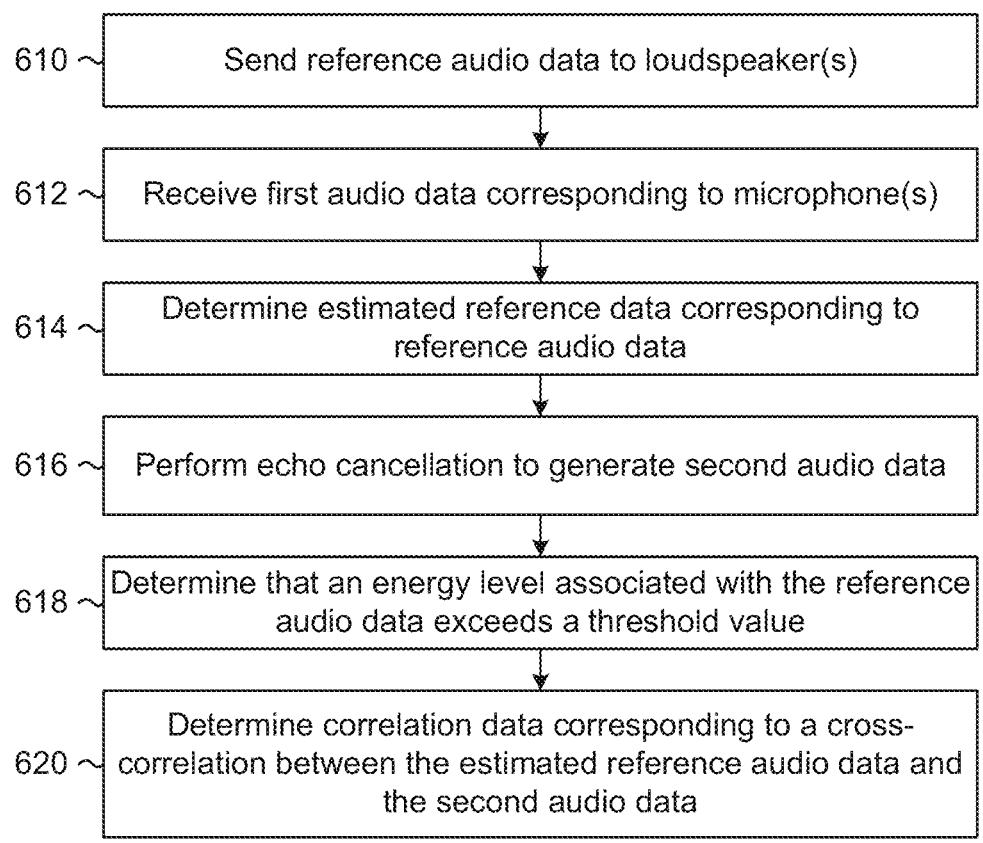
FIG. 6 is a flowchart conceptually illustrating an example method for generating correlation data according to embodiments of the present disclosure.

FIG. 6 is a flowchart conceptually illustrating an example method for generating correlation data according to embodiments of the present disclosure. As illustrated in FIG. 6, the the device 110 may send (610) reference audio data to loudspeaker(s) associated with the device 110 to generate playback audio and the AFE component 410 of the device 110 may receive (612) first audio data corresponding to microphone(s) of the device 110. For example, the first audio data may include a representation of local speech along with a representation of the playback audio (e.g., echo signal).

The AFE component 410 may determine (614) estimated reference data corresponding to the reference audio data and may perform (616) echo cancellation to generate second audio data. For example, the AFE component 410 may determine the estimated reference data using transfer functions and/or the like and the estimated reference data may correspond to at least a portion of the echo signal represented in the first audio data. After determining the estimated reference data, the AFE component 410 may perform echo cancellation to remove the estimated reference data from the first audio data and generate the second audio data.

The AFE component 410 may optionally determine (618) that an energy level associated with the reference audio data exceeds a threshold value and may determine (620) correlation data corresponding to a cross-correlation between the estimated reference audio data and the second audio data. If the energy level associated with the reference audio data is below the threshold value, the AFE component 410 may skip step 620 and not determine the correlation data. As described above, the correlation data includes correlation values that indicate an amount of correlation between the estimated reference audio data and the second audio data. When the correlation values are high, the estimated reference audio data is strongly correlated to the second audio data, indicating that local speech is not present and any audible word and/or utterance represented in the second audio data was generated by the device 110 (e.g., machine generated audio generated by a non-human entity). In contrast if the correlation values are low, the estimated reference audio data is weakly correlated to the second audio data, indicating that local speech is present and that an audible word and/or utterance represented in the second audio data may be generated by a user (e.g., utterance generated by a human).

Figure 7:
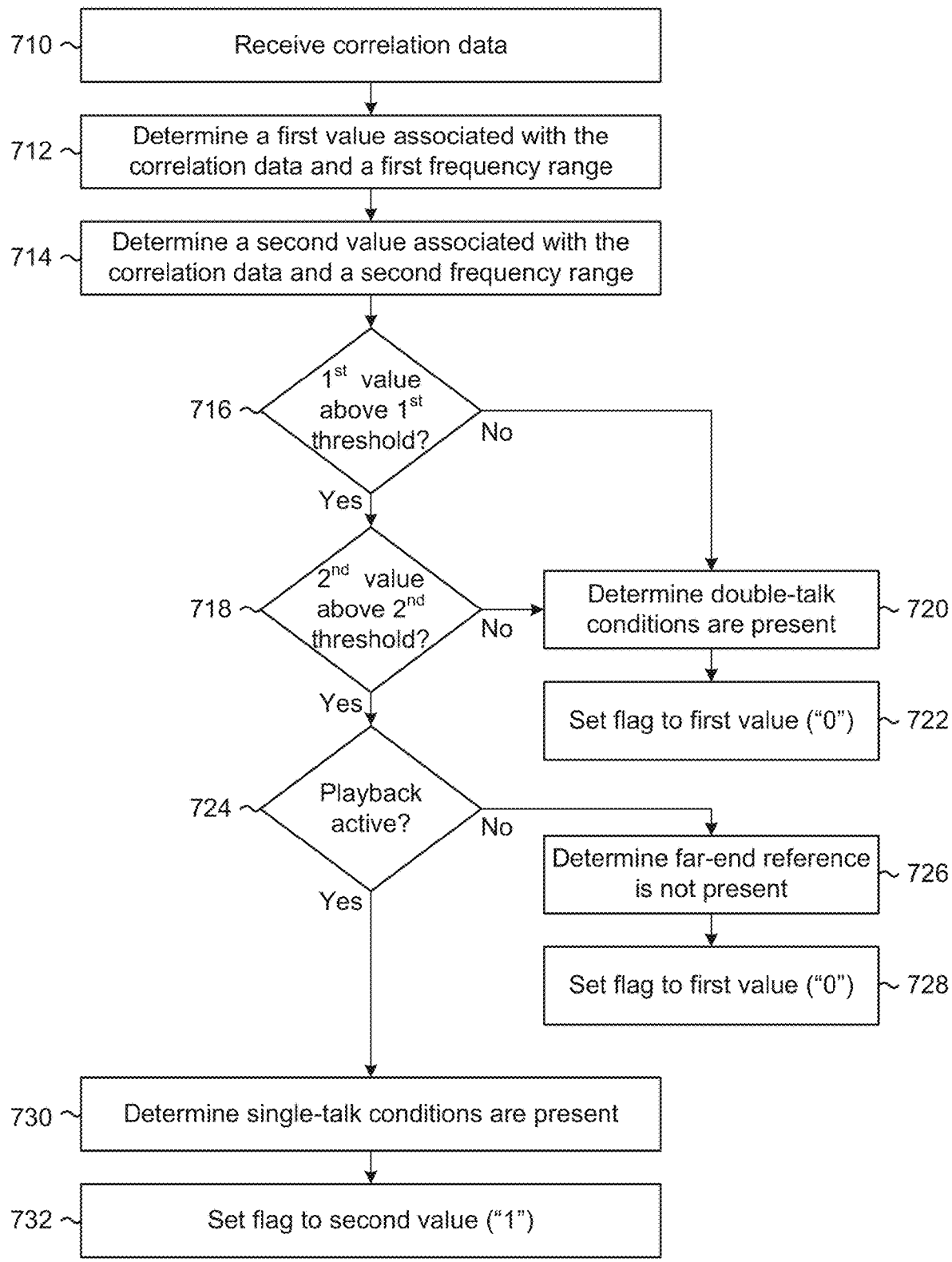
FIG. 7 is a flowchart conceptually illustrating an example method for generating DTD data according to embodiments of the present disclosure.

FIG. 7 is a flowchart conceptually illustrating an example method for generating DTD data according to embodiments of the present disclosure. As illustrated in FIG. 7, the AFE component 410 may receive (710) the correlation data, may determine (712) a first value associated with the correlation data and a first frequency range, and may determine (714) a second value associated with the correlation data and a second frequency range. For example, the AFE component 410 may determine the first value by taking an arithmetic mean (e.g., average) of first correlation values associated with the first frequency range (e.g., range of subbands near 1 kHz) and the second value by taking the arithmetic mean of second correlation values associated with the second frequency range (e.g., range of subbands between 2 kHz and 4 kHz), although the disclosure is not limited thereto.

The AFE component 410 may determine (716) whether the first value is above a first threshold value and may determine (718) whether the second value is above a second threshold value, as described above with regard to FIG. 3. If the first value is not above the first threshold value in step 716, or the second value is not above the second threshold value in step 718, the AFE component 410 may determine (720) that double-talk conditions are present and set (722) a flag to a first value (e.g., "0").

If the first value exceeds the first threshold value and the second value exceeds the second threshold value, the AFE component 410 may determine (724) whether playback is active and, if not, may determine (726) that a far-end reference is not present and set (728) the flag to the first value (e.g., "0"). In some examples, the AFE component 410 may determine whether playback is active by determining whether the reference audio data sent to the loudspeaker(s) exceeds an energy threshold value. If the reference audio data does not exceed the energy threshold value, self-trigger prevention does not need to be performed as the echo signal will not be strong enough to trigger the wakeword engine 450.

If the playback signal is active, the AFE component 410 may determine (730) that single-talk conditions are present and may set (732) the flag to a second value (e.g., "1"). For example, the AFE component 410 may determine that far-end single-talk conditions are present and may set the flag to the second value to enable self-trigger prevention, although the disclosure is not limited thereto.

Figure 8:
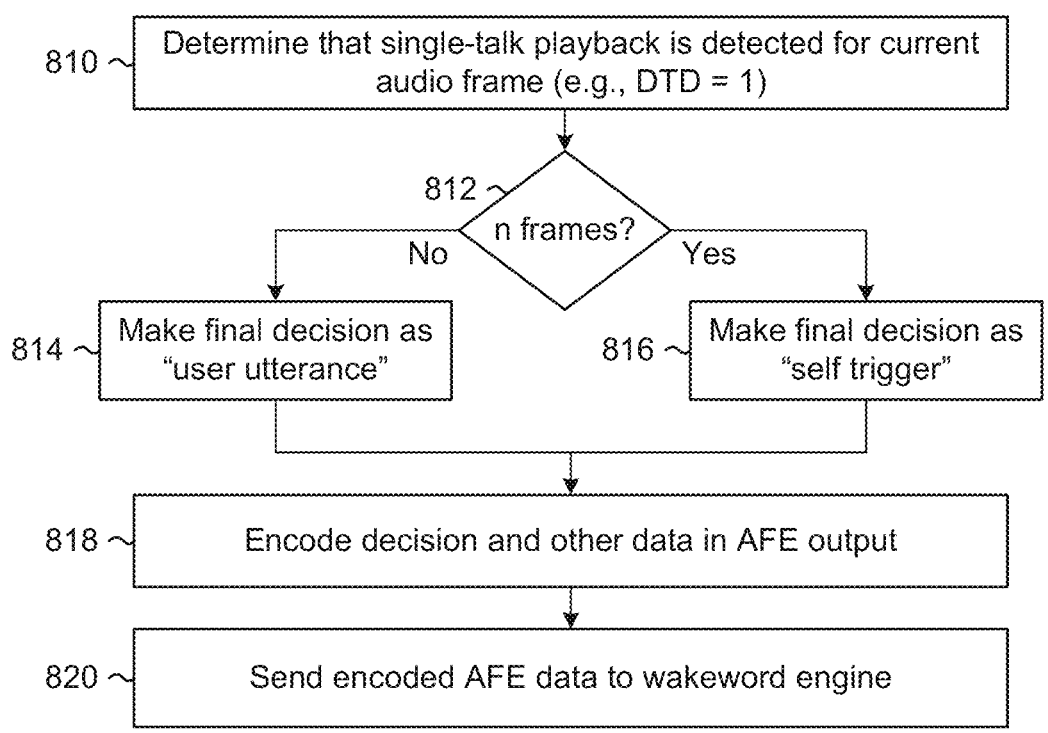
FIG. 8 is a flowchart conceptually illustrating an example method for generating and encoding DTD data according to embodiments of the present disclosure.

FIG. 8 is a flowchart conceptually illustrating an example method for generating and encoding DTD data according to embodiments of the present disclosure. As illustrated in FIG. 8, the AFE component 410 may determine (810) that single-talk playback is detected for a current audio frame (e.g., raw DTD data is equal to "1") and may determine (812) whether the single-talk playback is detected for n audio frames preceding the current audio frame. For example, if any of the previous n audio frames (e.g., 10 sequential audio frames) are associated with the first value (e.g., "0"), the AFE component 410 may make (814) a final decision as "user utterance" (e.g., store the first value of "0"). In contrast, if all of the previous n audio frames have the second value (e.g., "1"), the AFE component 410 may make (816) the final decision as "self-trigger" (e.g., store the second value of "1"). The AFE component 410 may then encode (818) the decision and other data in AFE output and may send (820) the encoded AFE data to the wakeword engine 450, as described above with regard to FIGS. 4-5.

Figure 9:
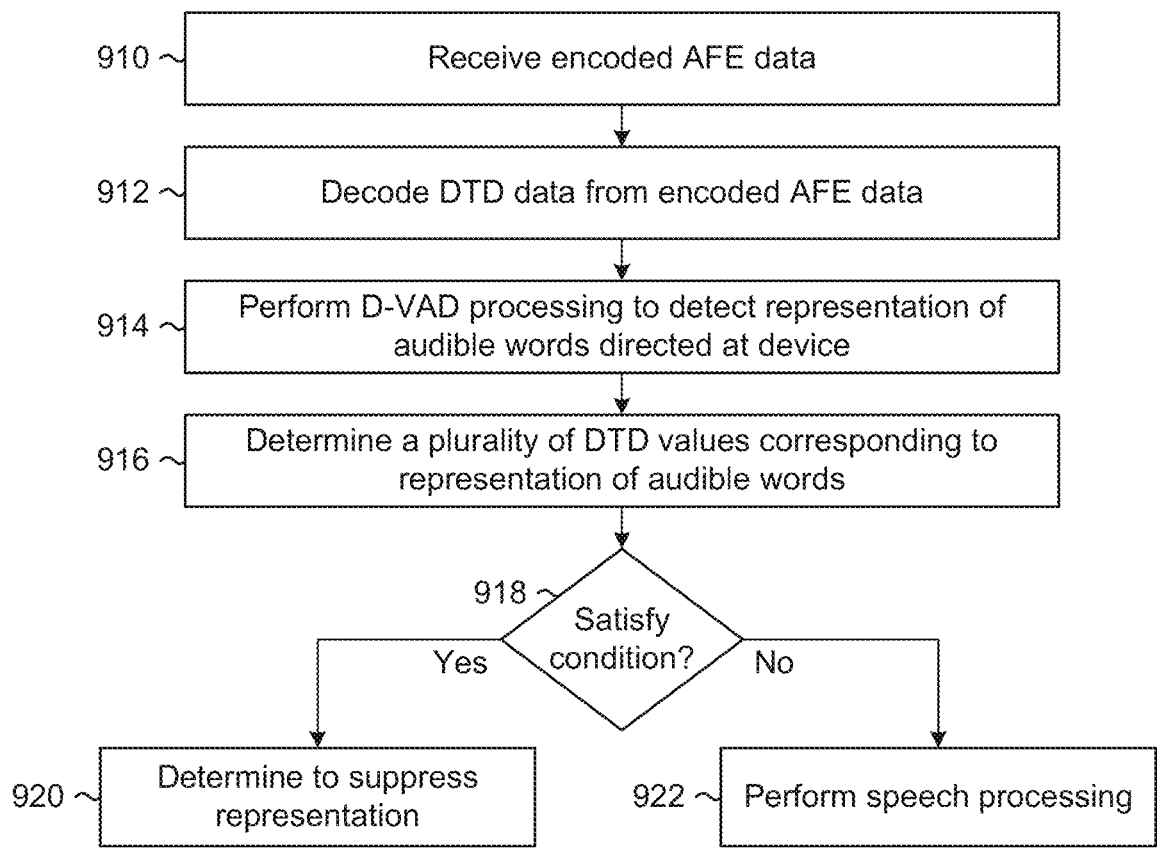
FIG. 9 is a flowchart conceptually illustrating an example method for performing self-trigger prevention according to embodiments of the present disclosure.

FIG. 9 is a flowchart conceptually illustrating an example method for performing self-trigger prevention according to embodiments of the present disclosure. As illustrated in FIG. 9, the wakeword engine 450 may receive (910) encoded AFE data and may decode (912) the DTD data from the encoded AFE data, as described above with regard to FIG. 6. In addition, the wakeword engine 450 may perform (914) device-directed voice activity detection (D-VAD) processing to detect a representation of audible words directed at the device 110 (e.g., device directed utterance).

The wakeword engine 450 may determine (916) a plurality of DTD values corresponding to the representation of audible words and may determine (918) whether the plurality of DTD values satisfy a condition. If the plurality of DTD values satisfy the condition, the wakeword engine 450 may determine (920) to suppress the representation. For example, the wakeword engine 450 may determine to suppress the representation when all of the DTD values have the second value (e.g., "1"). In contrast, if the plurality of DTD values do not satisfy the condition, the wakeword engine 450 may perform (922) speech processing on the representation of audible words. For example, the wakeword engine 450 may determine to perform speech processing if any of the DTD values have the first value (e.g., "0").

Figure 10:
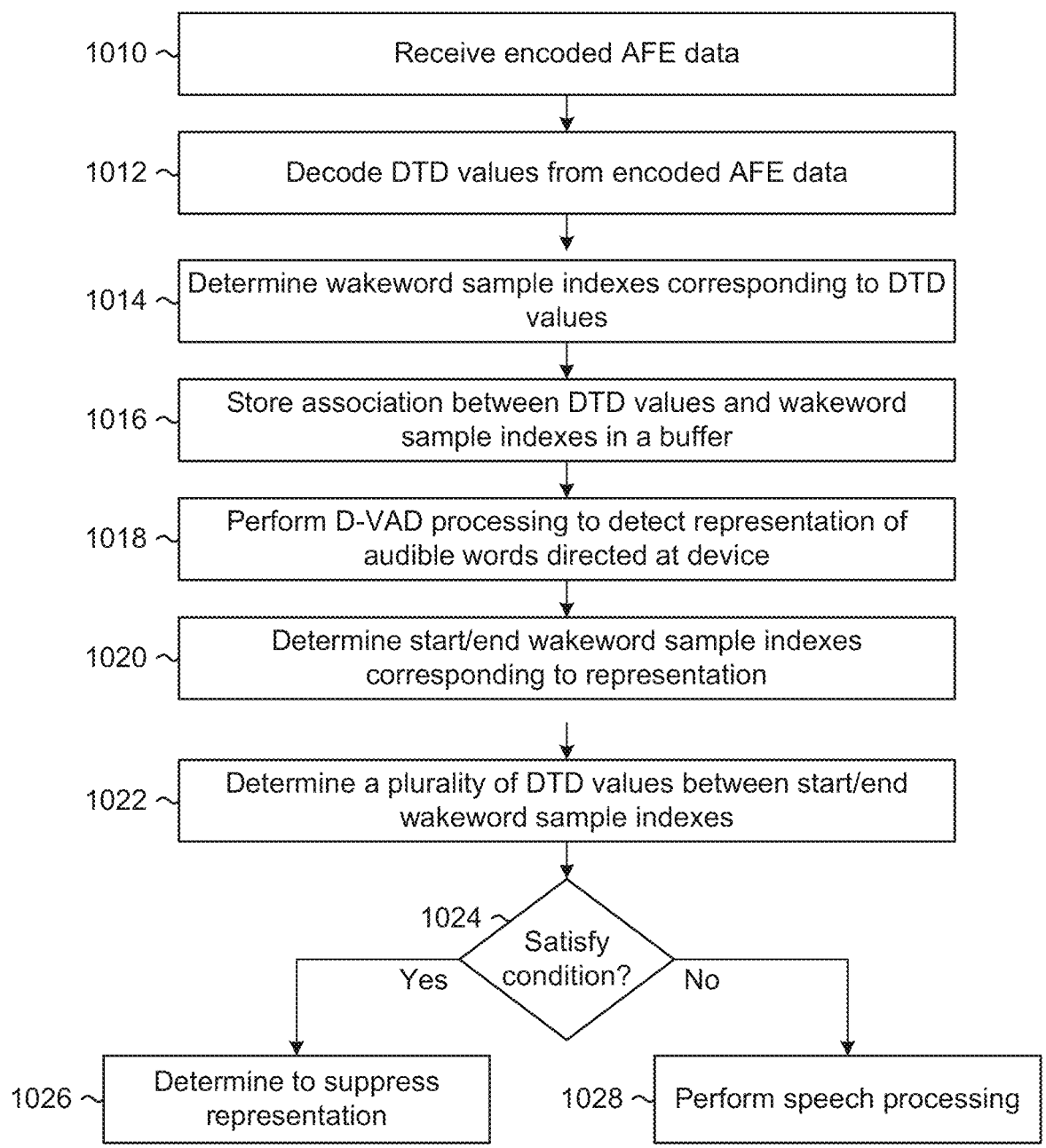
FIG. 10 is a flowchart conceptually illustrating an example method for performing synchronization and self-trigger prevention according to embodiments of the present disclosure.

FIG. 10 is a flowchart conceptually illustrating an example method for performing synchronization and self-trigger prevention according to embodiments of the present disclosure. As illustrated in FIG. 10, the wakeword engine 450 may receive (1010) encoded AFE data and may decode (1012) DTD values from the encoded AFE data, as described above with regard to FIG. 6. In addition, the wakeword engine 450 may determine (1014) wakeword sample indexes corresponding to the DTD values and may store (1016) associations between the DTD values and corresponding wakeword sample indexes in a buffer. For example, the wakeword engine 450 may store a first association between a first DTD value and a first wakeword sample index, a second association between a second DTD value and a second wakeword sample index, and so on.

The wakeword engine 450 may perform (1018) device-directed voice activity detection (D-VAD) processing to detect a representation of audible words directed at the device 110 (e.g., device directed utterance) and may determine (1020) start/end wakeword sample indexes corresponding to the representation. For example, the wakeword engine 450 may determine a beginning wakeword sample index corresponding to a beginning of the representation and an ending wakeword sample index corresponding to an end of the representation.

The wakeword engine 450 may determine (1022) a plurality of DTD values between the start/end wakeword sample indexes (e.g., corresponding to the representation) and may determine (1024) whether the plurality of DTD values satisfy a condition. If the plurality of DTD values satisfy the condition, the wakeword engine 450 may determine (1026) to suppress the representation. For example, the wakeword engine 450 may determine to suppress the representation when all of the DTD values have the second value (e.g., "1"). In contrast, if the plurality of DTD values do not satisfy the condition, the wakeword engine 450 may perform (1028) speech processing on the representation of audible words. For example, the wakeword engine 450 may determine to perform speech processing if any of the DTD values have the first value (e.g., "0").

Figure 11:
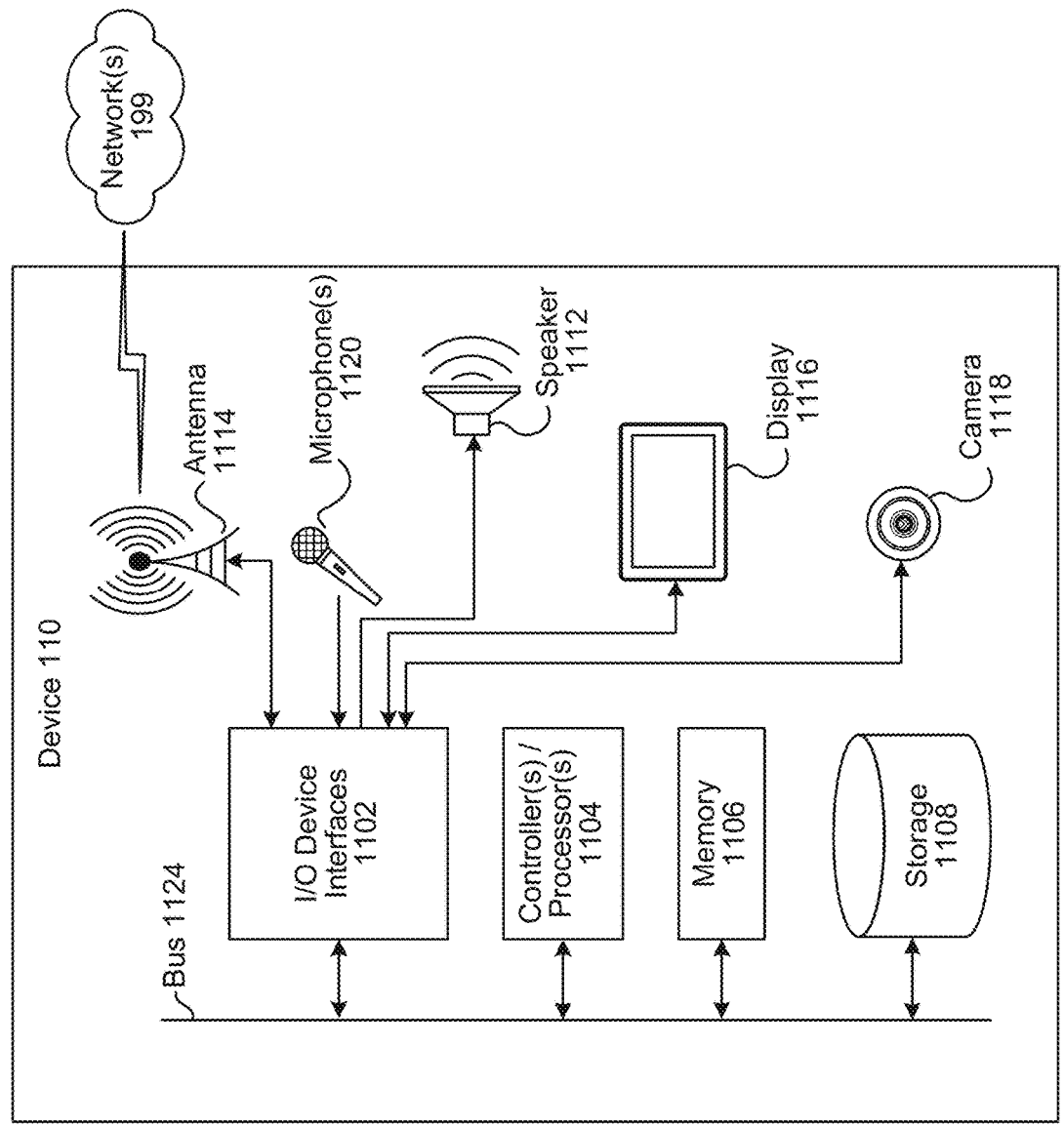
FIG. 11 is a block diagram conceptually illustrating example components of a device, according to embodiments of the present disclosure.
Figure 12:
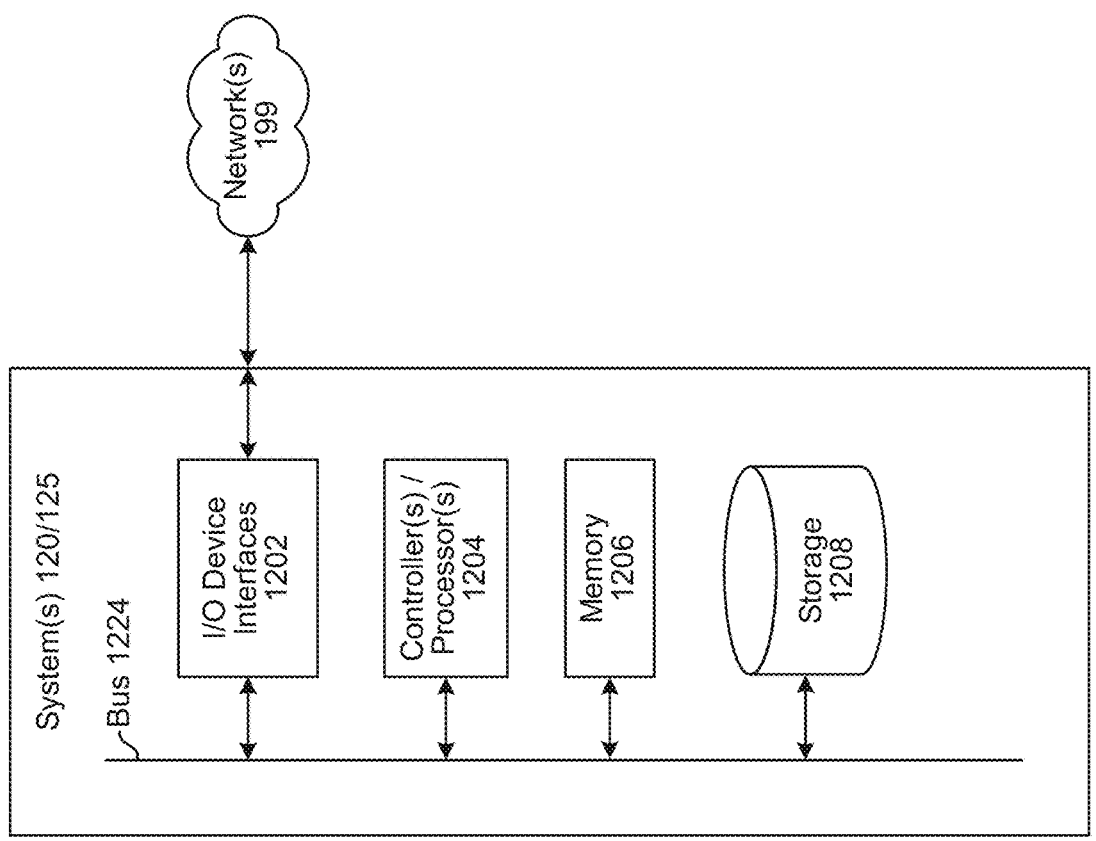
FIG. 12 is a block diagram conceptually illustrating example components of a system, according to embodiments of the present disclosure.

FIG. 11 is a block diagram conceptually illustrating a device 110 that may be used with the remote system 120. FIG. 12 is a block diagram conceptually illustrating example components of a remote device, such as the remote system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more remote systems 120 for performing ASR processing, one or more remote systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device 110, the remote system 120, and/or a skill component 125 may include their own dedicated processors, memory, and/or storage. Alternatively, one or more of the components of the device 110, the remote system 120, and/or a skill component 125 may utilize the I/O interfaces (1102/1202), processor(s) (1104/1204), memory (1106/1206), and/or storage (1108/1208) of the device(s) 110, system 120, or the skill component 125, respectively. Thus, the ASR component may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

As illustrated in FIG. 13, multiple devices (110a-110g and 120) may contain components of the system and the devices may be connected over a network(s) 199. The network(s) 199 may include a local or private network or may include a wide network such as the Internet. Devices may be connected to the network(s) 199 through either wired or wireless connections. As illustrated in FIG. 13, a tablet computer 110a, a smart phone 110b, a smart watch 110c, speech-detection device(s) with a display 110d, speech-detection device(s) 110e, input/output (I/O) limited device 110f, and/or a motile device 110g (e.g., device capable of autonomous motion) may be connected to the network(s) 199 through a wired and/or wireless connection. For example, the devices 110 may be connected to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like.

Other devices are included as network-connected support devices, such as the remote system 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an Audio Front End (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
    sending, by a device to at least one loudspeaker of the device, reference audio data;
    receiving, by an audio front end component of the device from at least one microphone of the device, first audio data representing both speech and audio corresponding to the reference audio data;
    generating estimated reference data corresponding to the reference audio data;
    generating second audio data representing the speech by removing the estimated reference data from the first audio data;
    generating correlation data by determining a cross-correlation between the estimated reference data and the second audio data;
    determining, using the correlation data, a first correlation value corresponding to a first frequency range;
    determining, using the correlation data, a second correlation value corresponding to a second frequency range;
    determining that the first correlation value exceeds a first threshold value;
    determining that the second correlation value exceeds a second threshold value;
    in response to determining that the first correlation value exceeds the first threshold value and the second correlation value exceeds the second threshold value, setting a first bit of first data to a first value;
    generating, by the audio front end component, third audio data by encoding the second audio data using the first data;
    determining, by a wakeword engine component of the device, that a portion of the third audio data includes a first representation of a wakeword;
    determining, by the wakeword engine component, a first plurality of bits of the first data that correspond to the portion of the third audio data, the first plurality of bits including the first bit;
    determining, based at least in part on the first plurality of bits, that the first representation of the wakeword was generated by the device; and
    ignoring the first representation of the wakeword.

2. The computer-implemented method of claim 1, further comprising:
    determining, by the wakeword engine component, that a second portion of the third audio data includes a second representation of the wakeword;
    determining a second plurality of bits of the first data that correspond to the second portion of the third audio data;
    determining that the second plurality of bits includes a second value; and
    in response to determining that the second plurality of bits includes the second value, causing speech processing to be performed on the second portion of the third audio data.

3. The computer-implemented method of claim 1, further comprising:
    determining, using the correlation data, a third correlation value corresponding to the first frequency range;
    determining, using the correlation data, a fourth correlation value corresponding to the second frequency range;
    determining that the third correlation value is below the first threshold value;
    in response to determining that the third correlation value is below the first threshold value, setting at least a second bit of the first data to a second value;
    determining a second plurality of bits of the first data that correspond to a second portion of the third audio data, the second plurality of bits including the second bit; and
    causing, based at least in part on the second plurality of bits, speech processing to be performed on the second portion of the third audio data.

4. The computer-implemented method of claim 1, wherein setting the first bit of the first data further comprises:
    in response to determining that the first correlation value exceeds the first threshold value and the second correlation value exceeds the second threshold value, determining that a first audio frame of the second audio data corresponds to single-talk conditions;
    determining that a first number of audio frames in the second audio data correspond to the single-talk conditions, the first number of audio frames preceding the first audio frame; and
    setting the first bit of the first data to the first value.

5. A computer-implemented method, the method comprising:
    determining, by a device, correlation data corresponding to first audio data;
    determining, using the correlation data, a first correlation value corresponding to a first frequency range;
    determining, using the correlation data, a second correlation value corresponding to a second frequency range;
    determining that the first correlation value exceeds a first threshold value;
    determining that the second correlation value exceeds a second threshold value;
    in response to determining that the first correlation value exceeds the first threshold value and the second correlation value exceeds the second threshold value, setting at least one bit of first data to a first value; and
    generating second audio data by encoding the first audio data using the first data.

6. The computer-implemented method of claim 5, further comprising:
    determining that a representation of an audible word is included in a portion of the second audio data;
    determining a plurality of bits of the first data corresponding to the portion of the second audio data;
    determining that the plurality of bits only includes the first value; and
    ignoring the representation of the audible word.

7. The computer-implemented method of claim 5, further comprising:
    determining that a representation of an utterance is included in a portion of the second audio data;
    determining a plurality of bits of the first data corresponding to the portion of the second audio data;
    determining that the plurality of bits includes a second value; and
    causing, based at least in part on the plurality of bits, speech processing to be performed on the portion of the second audio data.

8. The computer-implemented method of claim 5, further comprising:
    sending reference audio data to at least one loudspeaker of the device;

receiving third audio data representing speech captured by the device;
determining estimated reference data corresponding to the reference audio data; and
generating the first audio data by removing the estimated reference data from the third audio data,
wherein determining the correlation data further comprises generating the correlation data by determining a cross-correlation between the estimated reference data and the first audio data.

9. The computer-implemented method of claim 5, wherein determining the first correlation value further comprises:
determining, from the correlation data, a first plurality of values corresponding to the first frequency range; and
determining the first correlation value by calculating an arithmetic mean of the first plurality of values,
wherein determining the second correlation value further comprises:
determining, from the correlation data, a second plurality of values corresponding to the second frequency range; and
determining the second correlation value by calculating the arithmetic mean of the second plurality of values.

10. The computer-implemented method of claim 5, wherein prior to setting the at least one bit of the first data to the first value, the method further comprises:
in response to determining that the first correlation value exceeds the first threshold value and the second correlation value exceeds the second threshold value, determining that a first audio frame of the first audio data corresponds to single-talk conditions; and
determining that a first number of audio frames prior to the first audio frame correspond to the single-talk conditions.

11. The computer-implemented method of claim 5, further comprising:
sending reference audio data to at least one loudspeaker of the device;
determining that a portion of the reference audio data is below a third threshold value;
setting a second bit of the first data to a second value, the second bit corresponding to the portion of the reference audio data;
determining that a representation of an audible word is included in a portion of the second audio data;
determining a plurality of bits of the first data corresponding to the portion of the second audio data, the plurality of bits including the second bit; and
causing, based at least in part on the plurality of bits, speech processing to be performed on the portion of the second audio data.

12. The computer-implemented method of claim 5, further comprising:
determining, using the correlation data, a third correlation value corresponding to the first frequency range;
determining, using the correlation data, a fourth correlation value corresponding to the second frequency range;
determining that the third correlation value is below the first threshold value;
in response to determining that the third correlation value is below the first threshold value, setting at least a second bit of the first data to a second value;
determining that a representation of an audible word is included in a portion of the second audio data;
determining a plurality of bits of the first data corresponding to the portion of the second audio data, the plurality of bits including the second bit; and
causing, based at least in part on the plurality of bits, speech processing to be performed on the portion of the second audio data.

13. A system comprising:
at least one processor; and
memory including instructions operable to be executed by the at least one processor to cause the system to:
determine, by a device, correlation data corresponding to first audio data;
determine, using the correlation data, a first correlation value corresponding to a first frequency range;
determine, using the correlation data, a second correlation value corresponding to a second frequency range;
determine that the first correlation value exceeds a first threshold value;
determine that the second correlation value exceeds a second threshold value;
in response to determining that the first correlation value exceeds the first threshold value and the second correlation value exceeds the second threshold value, set at least one bit of first data to a first value; and
generate second audio data by encoding the first audio data using the first data.

14. The system of claim 13, wherein the memory further comprises instructions that, when executed by the at least one processor, further cause the system to:
determine that a representation of an audible word is included in a portion of the second audio data;
determine a plurality of bits of the first data corresponding to the portion of the second audio data;
determine that the plurality of bits only includes the first value; and
ignore the representation of the audible word.

15. The system of claim 13, wherein the memory further comprises instructions that, when executed by the at least one processor, further cause the system to:
determine that a representation of an utterance is included in a portion of the second audio data;
determine a plurality of bits of the first data corresponding to the portion of the second audio data;
determine that the plurality of bits includes a second value; and
cause, based at least in part on the plurality of bits, speech processing to be performed on the portion of the second audio data.

16. The system of claim 13, wherein the memory further comprises instructions that, when executed by the at least one processor, further cause the system to:
send reference audio data to at least one loudspeaker of the device;
receive third audio data representing speech captured by the device;
determine estimated reference data corresponding to the reference audio data;
generate the first audio data by removing the estimated reference data from the third audio data; and
generate the correlation data by determining a cross-correlation between the estimated reference data and the first audio data.

17. The system of claim 13, wherein the memory further comprises instructions that, when executed by the at least one processor, further cause the system to:

determine, from the correlation data, a first plurality of values corresponding to the first frequency range;

determine the first correlation value by calculating an arithmetic mean of the first plurality of values;

determine, from the correlation data, a second plurality of values corresponding to the second frequency range; and determine the second correlation value by calculating the arithmetic mean of the second plurality of values.

18. The system of claim 13, wherein, prior to setting the at least one bit of the first data to the first value, the memory further comprises instructions that, when executed by the at least one processor, further cause the system to:

in response to determining that the first correlation value exceeds the first threshold value and the second correlation value exceeds the second threshold value, determine that a first audio frame of the first audio data corresponds to single-talk conditions; and determine that a first number of audio frames prior to the first audio frame correspond to the single-talk conditions.

19. The system of claim 13, wherein the memory further comprises instructions that, when executed by the at least one processor, further cause the system to:

send reference audio data to at least one loudspeaker of the device;

determine that a portion of the reference audio data is below a third threshold value;

set a second bit of the first data to a second value, the second bit corresponding to the portion of the reference audio data;

determine that a representation of an audible word is included in a portion of the second audio data;

determine a plurality of bits of the first data corresponding to the portion of the second audio data, the plurality of bits including the second bit; and cause, based at least in part on the plurality of bits, speech processing to be performed on the portion of the second audio data.

20. The system of claim 13, wherein the memory further comprises instructions that, when executed by the at least one processor, further cause the system to:

determine, using the correlation data, a third correlation value corresponding to the first frequency range;

determine, using the correlation data, a fourth correlation value corresponding to the second frequency range;

determine that the third correlation value is below the first threshold value;

in response to determining that the third correlation value is below the first threshold value, set at least a second bit of the first data to a second value;

determine that a representation of an audible word is included in a portion of the second audio data;

determine a plurality of bits of the first data corresponding to the portion of the second audio data, the plurality of bits including the second bit; and cause, based at least in part on the plurality of bits, speech processing to be performed on the portion of the second audio data.

* * * * *